United States Patent

Naffa et al.

[11] 4,067,263
[45] Jan. 10, 1978

[54] CARGO SYSTEM WITH RESTRAINT BAR

[75] Inventors: Faisal A. Naffa, Sterling Heights, Mich.; Rudolph Messerschmidt, Alexandria, Va.

[73] Assignees: Brooks & Perkins, Incorporated, Southfield, Mich. ; by said Faisal A. Naffa; The United States of America as represented by the Secretary of the Army, Washington, D.C. ; by said Rudolph Messerschmidt

[21] Appl. No.: 706,501

[22] Filed: July 19, 1976

[51] Int. Cl.² .......................... B61D 17/08; B60P 7/14
[52] U.S. Cl. .................................. 105/499; 105/409; 105/423; 52/618; 296/28 M
[58] Field of Search ............... 105/376, 497, 498, 499, 105/500, 501, 502, 503; 220/1.5; 52/618, 625, 626, 630, 671–674; 296/28 M

[56] References Cited

U.S. PATENT DOCUMENTS

| 3,143,827 | 8/1964 | Showalter, Sr. ............... 56/626 X |
| 3,481,643 | 12/1969 | Campbell ........................... 56/618 X |
| 3,799,070 | 3/1974 | Munson ............................... 105/501 |

Primary Examiner—Albert J. Makay
Attorney, Agent, or Firm—Whittemore, Hulbert & Belknap

[57] ABSTRACT

A cargo container having opposed horizontally elongated vertically extending side walls, a floor, and a roof, and pre-assembled panel constructions comprising vertically corrugated sheet metal walls surrounded at top, bottom and both ends with extruded edge caps. The ends of the top and bottom caps carry adjustable corner abutment bolts which are advanced into contact with corner posts present on the container and are welded in place. The corrugated walls of the panel are bolted to the walls of the container to provide a substantially unitary wall-panel combination. The panels are provided with a multiplicity of openings for receiving the ends of removable restraint bars.

27 Claims, 10 Drawing Figures

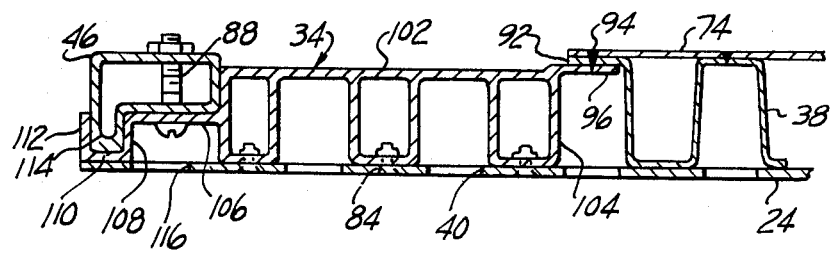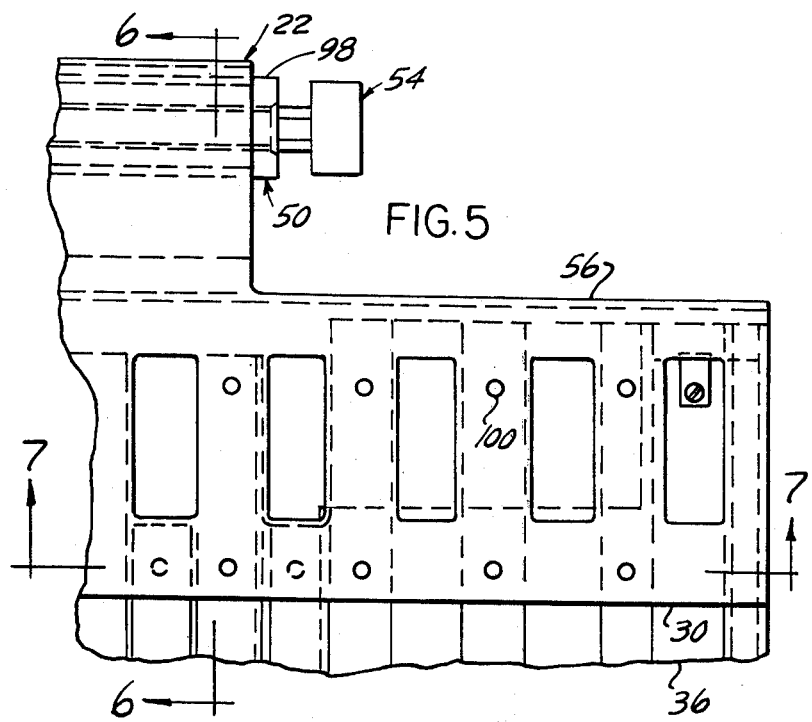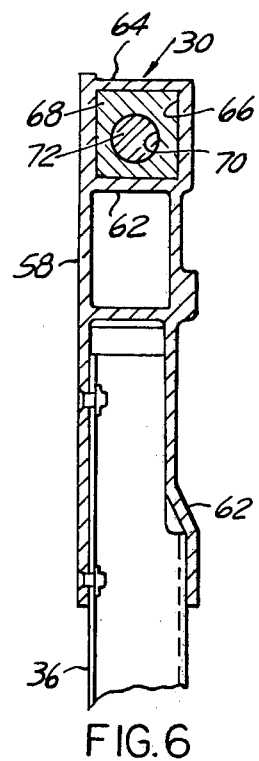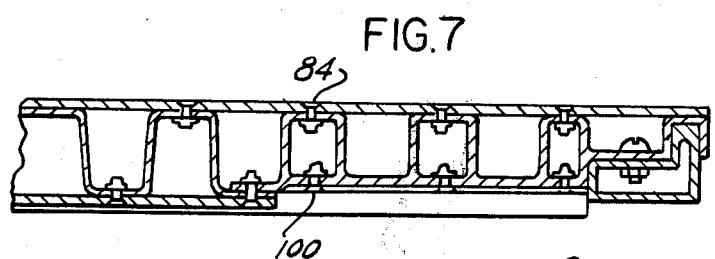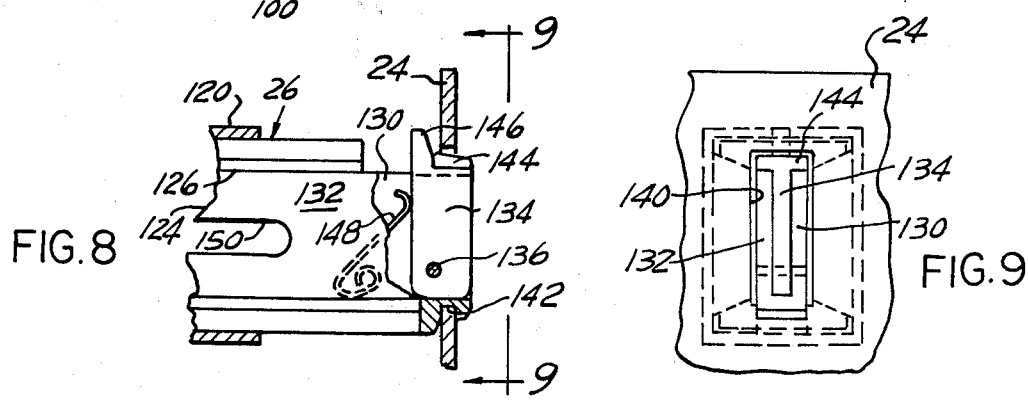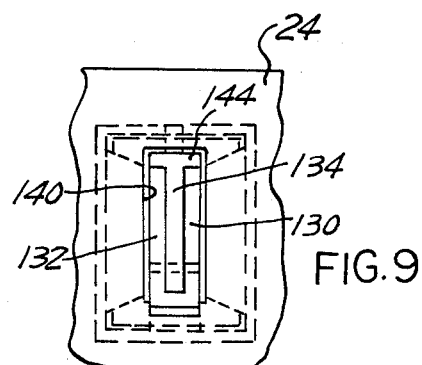

CARGO SYSTEM WITH RESTRAINT BAR

BRIEF SUMMARY OF THE INVENTION

The present invention relates to the conversion of standard vehicular cargo containers, such for example as the cargo carrying space of a truck, trailer, aircraft, or the like, in which the vehicle presents an elongated cargo space of moderate height and width. A typical example may be a container having a length of about twenty feet, a height of about eight feet, and a transverse width of about eight feet. This cargo space is defined in the vehicle between a floor, side walls, and a ceiling or roof and includes metal support posts at each corner of the space.

In accordance with the present invention, side panels are intially formed essentially of a skin of corrugated metal, such as aluminum, having upper, lower and end caps or frame bars of rigid extruded metal such as aluminum. The frame bars lend rigidity to the panel and provide means for rigidly securing the panels in position against the walls of the container.

Each panel is provided with a plurality of horizontally extending belt rails each having a multiplicity of openings therein to receive the ends of restraint bars having releasable latch means associated with the openings. By this arrangement the restraint bars may be positioned at different heights and in desired position longitudinally of the cargo space in order to restrain cargo components therein.

The belt rails are essentially formed of flat metal strips and the openings are provided therein to register with the inwardly concave portions of the corrugated metal skin, thus affording space for the reception of the latch elements at the ends of the cargo restraint bars.

Elongated tension strips are spot welded to the outboard side of the corrugated panel element directly opposite each belt rail to add strength and rigidity to the panel.

BRIEF DESCRIPTION OF THE DRAWINGS

FIG. 4 is an enlarged fragmentary sectional view on the line 4—4, FIG. 3.

FIG. 5 is an elevational view at the upper right hand corner of a panel.

FIG. 6 is a sectional view on the line 6—6, FIG. 5.

FIG. 7 is a sectional view on the line 7—7, FIG. 5.

FIG. 8 is an elevational view, partly in section, showing the latching structure for a restraint bar.

FIG. 9 is an elevational view looking in the direction of the arrows 9—9, FIG. 8.

DETAILED DESCRIPTION

Figure 10:
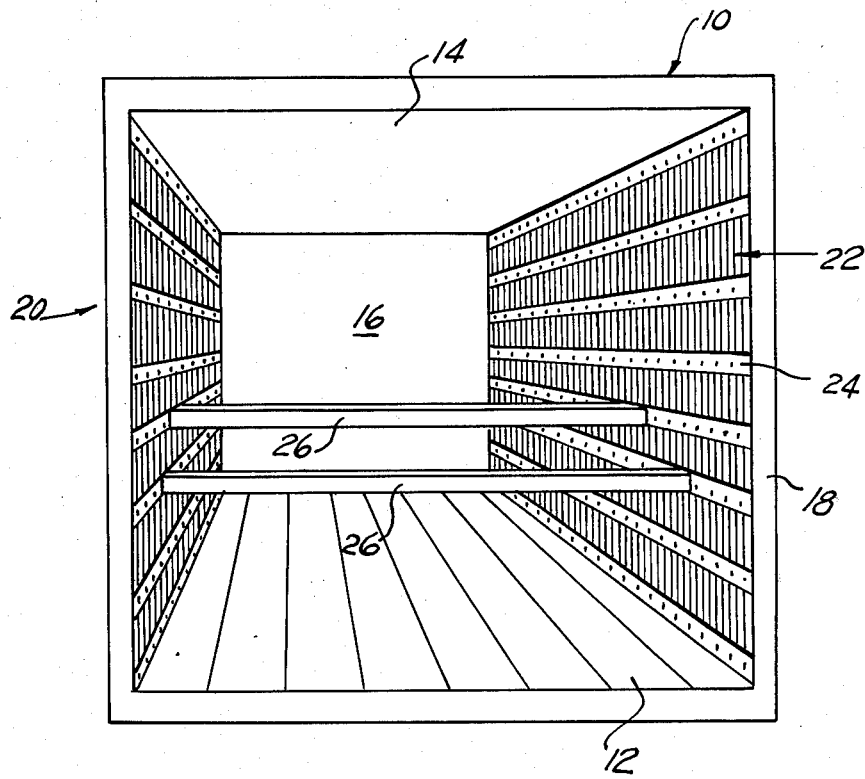
FIG. 10 is a view looking into the interior of a container in which the panels have been secured in place.

Before referring to details of the construction of the panels and the manner in which the panels are applied to the interior of a cargo container, reference is made to FIG. 10. In this Figure the original container, which may be the cargo carrying space of a vehicle as previously described, is illustrated in its entirety at 10 and includes a floor 12, an overhead ceiling or roof structure 14, and inner end walls 16 and side walls 18 and 20. The system is completed by the insertion of previously assembled panels shown in their entirety at 22 including belt rails 24 having openings therein as will subsequently be described for the reception of latches provided at the ends of cargo restraint bars 26.

Figure 1:
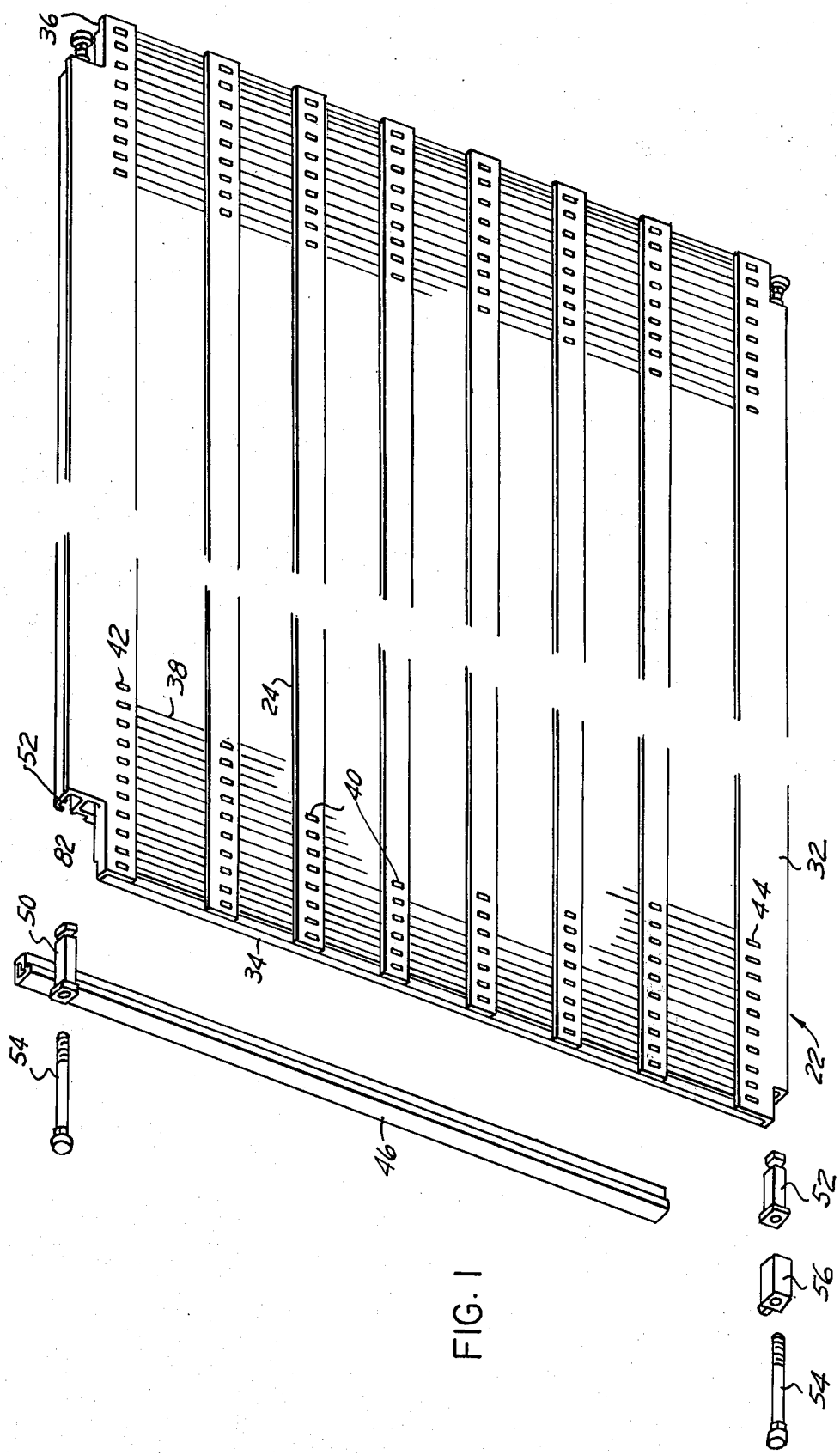
FIG. 1 is a partially exploded perspective view of a panel including a spacer element and adjustable corner bolts.

Referring now to FIG. 1, one of the panels 22 is illustrated, the center portion being omitted. The panel comprises basically an upper cap or frame bar 30, a lower cap or frame bar 32, and vertically extending end caps or frame bars 34 and 36. These caps or frame bars are pemanently attached to a vertically corrugated sheet metal skin 38. The corrugated sheet metal constituting the skin 38 may conceivably be of one-piece, but ordinarily it is assembled in the construction of the panel from a plurality of corrugated pieces in which the corrugations are arranged to extend vertically.

Extending longitudinally of the panel are a plurality of the belt rails 24 each of which is provided with a series of spaced openings 40. The openings 40 are shaped and dimensioned to cooperate with a special restraint bar latch which will subsequently be described. The spacing of the openings 40 is such as to locate each opening 40 over a space between inwardly presented corrugation ribs, the space being provided for the purpose of receiving the inwardly extending ends of the restraint bar latch elements. It will be noted that the upper and lower caps or frame bars 30 and 32 are provided with a like sequence of similarly dimensioned and located openings 42 and 44 respectively.

In assembling with the original container, as will subsequently be described, it is desirable for the outer wall of each panel 22 to conform to the outer wall of the container and to corner posts usually provided thereat. Depending upon the precise construction of the original container for which the panels are designed, it may be desirable to use a spacer 46 which as shown is a tubular extrusion.

A bushing 50 is provided which is received in an opening 52 provided in the upper cap 30, this bushing receiving a threaded corner bolt 54 which is adapted to be screwed out of the bushing to the extent necessary to engage firmly with the post of the original container.

A similar bolt 54 and bushing 50 is provided for the lower cap or frame bar 32 and at this point there is illustrated a spacer block 55 which may or may not be required depending upon the construction of the original container.

Figure 2:
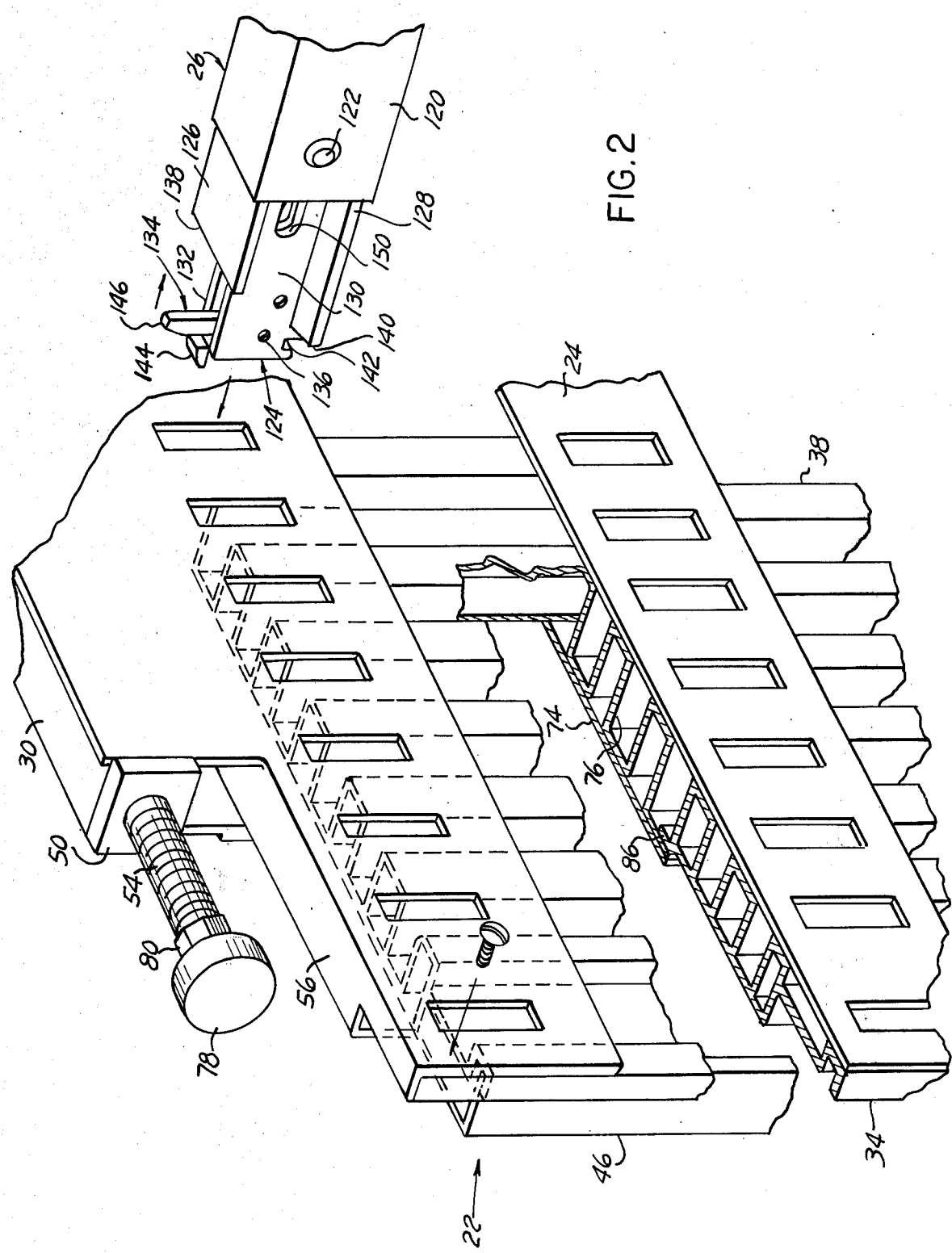
FIG. 2 is an enlarged view of the structure at the upper left hand corner of FIG. 1, showing in addition the end of one restraint bar.

Referring now to FIG. 2 the upper left hand corner of the panel 22 is illustrated in greatly enlarged form. In this view it will be observed that the corner bolt 54 is illustrated as threaded into the bushing 50 which has been inserted into the opening in the upper cap 30. In this Figure it will be observed that the top corner of the cap has been removed down to the transverse partition indicated at 56. Referring briefly to FIG. 6, which is a sectional view through the top cap 30, it will be observed that the extruded section includes side flanges 58 and 60, the flange 60 being offset as indicated at 62 at the rear of the panel. In addition to the partition 56 there is provided a partition 62 which with the top wall 64 provides the substantially square opening 66 which receives the reduced portion 68 of the bushing 50, the bushing having the threaded opening indicated at 70 which receives the threaded portion 72 of the corner bolt 54.

Referring again to FIG. 2 the corrugated skin 38 is illustrated and is spot welded to the belt rails 24 and also along the top, bottom, and side edges to the top, bottom and side caps 30, 32, 34 and 36 respectively. This Figure also clearly illustrates the sectional shape of the extrusion constituting the side cap 34. Also in this Figure there is illustrated the end of a tension strip 74 which is spot welded to the outwardly facing ribs 76 of the corrugated panel skin 38. A portion of a spacer tube 46 is illustrated in the Figure, it being understood that this spacer tube may or may not be employed depending upon the configuration of the container to which the panel is applied.

It will be observed that the corner bolt 54 is provided with a generally cylindrical head 78 which will be welded to the adjacent corner post of the container, and that inwardly of the cylindrical head 78 the corner bolt is provided with a polygonal portion 80 which may be gripped by a wrench or the like to adjust the bolt as required.

Figure 3:
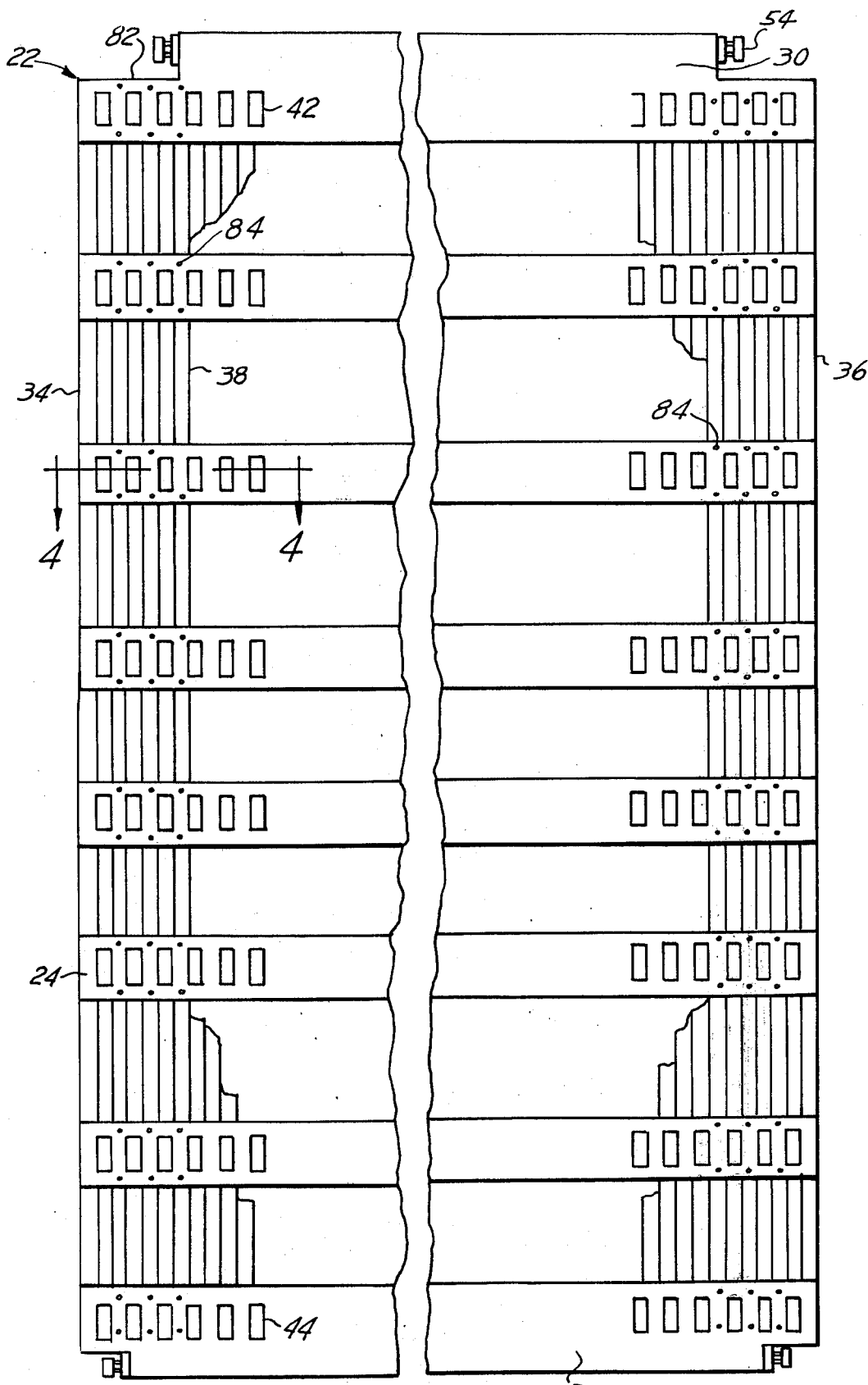
FIG. 3 is an enlarged elevational view of a panel with the center section broken away.

FIG. 3 is an elevational view of a completed panel 22 showing the cutaway corner portions indicated generally in this Figure at 82 and showing the top cap or frame bar 30, the bottom cap or frame bar 32, both having latch receiving openings indicated at 42 and 44 respectively. In this Figure there is also seen the corrugated panel skin 38, the belt rails 24 the ends of which are permanently secured to the side caps 34 and 36 as indicated by suitable means such as blind rivets 84.

The edges of the corrugated skin 38 are spot welded to the rear surfaces of the side caps, the connection to the side cap 34 being illustrated at 86 in FIG. 2. FIG. 2 also illustrates the location of the corner bolts 54.

Referring now to FIG. 4, which is a section on the line 4—4 of FIG. 1, there is illustrated the left side cap or frame bar 34 to which is fastened the tube spacer 46, the connection being illustrated in the Figure as comprising the nut and bolt 88. In this Figure it will be observed that a belt rail 24 having the openings 40 is attached at its ends to the side caps 34 by means illustrated in this Figure as the blind rivets 84, although other connections, such for example as spot welding might be employed.

FIG. 4 also illustrates the corrugated panel skin 38 as terminating at its side in an edge portion indicated at 92, which is spot welded as indicated at 94 to a flange 96 on side cap or frame bar 34. The spot weld may also connect the end of the tension strip 74 thereto.

Reference is now made to FIGS. 5, 6 and 7 in which FIG. 5 is a fragmentary enlarged elevational view taken at the upper right hand corner of a panel 22. In this Figure it will be observed that the end of the top cap 30 is cut away to expose the upper surface of the partition 56. The reduced portion 68 of the bushing 50 is of square cross-section and fits within the square opening extending along the top of the top cap 30 between the top wall 64 thereof and the intermediate partition 62. The bushing 50 is threaded throughout its length and has an enlarged head portion illustrated in FIG. 5 at 98. The top cap 30 is riveted or otherwise permanently secured to the top of the adjacent side of the cap 36, the riveted connections being illustrated in FIG. 5 at 100.

The side caps 34 and 36 have a cross-sectional shape well illustrated in FIG. 4. It will be observed that the cross-sectional shape of this extrusion includes the inner flange 96 which is offset slightly from a continuous outer wall 102 from which extend forwardly hollow sections 104 which together present the appearance of a corrugated construction as viewed from inside the vehicle. At the outer edge of the end caps there is a flange 106 which is intermediate the outer wall 102 and the front surface occupied by the front walls of the hollow sections 104. This flange terminates in a forwardly projecting wall portion 108, a further surface portion 110, and a short outwardly extending flange 112. These wall sections define therebetween a channel in which a projecting portion 114 of the spacer 46 extends. The belt rail 24 includes end openings 116 which overlie the flange 106 of the end cap 34, thereby permitting a restraint bar to be positioned so as to extend across the cargo space at the extreme end thereof.

From the foregoing it will be observed that the top and bottom caps 30 and 32 and the end caps 34 and 36 are permanently connected together as by the blind rivets illustrated or by spot welding, or the like. These caps or frame bars are of relatively heavy section and are quite rigid and impart rigidity to the entire panel. The space between the frame bars is completely filled by the panel skin 38 across the inner side of which (with respect to the cargo space) extend a multiplicity of horizontal vertically spaced belt rails welded or riveted to the panel skin 38 and the end caps, thus imparting further rigidity to the panel structure. Finally, the tension strips 74 are applied to the outer side of the panels, the ends thereof being welded or otherwise rigidly secured to the inner edges of the end caps. In addition, the tension strips are rigidly attached to the outer wall of each corrugation of the panel skin, thus materially strengthening the entire construction.

Referring now to FIGS. 2, 8 and 9 there is illustrated the latch mechanism provided at the ends of the restraint bar assemblies indicated generally at 26. The restraint bars 26 comprise an elongated hollow bar 120 of generally rectangular cross-section, having openings adjacent one end which receive a stop bolt 122. Slidable within the bar 120 is a bar extension 124 having a top flange 126, a bottom flange 128 and vertically spaced walls 130 and 132 having a space therebetween for the reception of a pivoted latch element 134. Latch element 134 is pivoted as indicated at 136 and is received between the spaced walls 130 and 132, the upper flange 126 being cut away as indicated at 138 for this purpose. The bottom flange 128 is also cut away as indicated at 140 and a notch 142 is provided which is adapted to hook over the lower edge of one of the openings 140 of a belt rail. The walls 130 and 132 are dimensioned to fit between the sides of the opening 40 as best illustrated in FIG. 9, and adjacent its top the latch element 134 is provided with a lateral enlargement 144 dimensioned to fit within the opening 40 so as to retain the end of a restraint bar assembly therein. Each of the latch elements is provided with an upwardly extending finger portion 146 by means of which the latch may be pivoted counterclockwise as viewed in FIG. 8 to move the enlargement 144 out of the opening 40 provided in a belt rail. Latch elements 134 are normally retained in latching position by a leaf spring 148.

The stop bolt 122 previously described extends through an elongated opening 150 provided in the walls 130 and 132 to permit sliding movement of the bar extension 124 while at the same time preventing its removal from the hollow bar 120.

When the latch has been swung inwardly to move the enlargement 144 out of the opening 40, the end of the bar extension 124 can be lifted sufficiently to release the hook 142 from the bottom of the opening, thus releasing the bar extension from the panel.

What I claim as my invention is:

1. A cargo carrier having a floor, a top wall, opposed side walls, and vertical posts at the corners thereof, a pair of pre-assembled panels permanently secured to the side walls and connected to said posts, each of said panels comprising rigid top and bottom caps extending horizontally for the full length of each panel, and rigid end caps extending vertically at the ends of each panel, said caps being rigidly connected together at their ends to form a rigid rectangular frame, a panel skin of corrugated metal entirely covering the space between said caps, the corrugations of said skin extending vertically to define a multiplicity of vertical elongated channels and interposed ribs exposed at the inboard sides of the panel, a multiplicity of belt rails extending horizontally between said end caps and secured thereto in spaced apart relation at the inboard side of said panel, said rails having latch receiving openings in registration with said channels, and cargo restraint bars dimensioned to extend across the space between said panels and having latch means releasably received in opposed openings in said belt rails.

2. A cargo carrier as defined in claim 1 in which said belt rails are secured to a multiplicity of the ribs of the panel skin.

3. A cargo carrier as defined in claim 2 in which said belt rails are welded to the ribs of said skin exposed at the inboard side thereof.

4. A cargo carrier as defined in claim 2 comprising in addition a plurality of parallel horizontal vertically spaced tension strips secured to the outboard sides of each of said panels.

5. A cargo carrier as defined in claim 4 in which the ends of said tension strips are permanently secured to said end caps.

6. A cargo carrier as defined in claim 5 in which the tension strips are also permanently secured to the top surfaces of the ribs of the panel skin at the outboard sides thereof.

7. A cargo carrier as defined in claim 6 in which a tension strip is provided directly opposite to each belt rail.

8. A cargo carrier as defined in claim 1 in which said top and bottom caps are provided with latch receiving openings such as those provided in said belt rails.

9. A cargo carrier as defined in claim 1 in which said top and bottom caps have inwardly open channels in which the top and bottom ends of the end caps are secured.

10. A cargo carrier as defined in claim 9 in which the top and bottom edges of said panel skins are also secured within said channels.

11. A cargo carrier as defined in claim 1 in which the ends of said top and bottom caps have longitudinally outwardly facing threaded recesses, adjustable corner bolts in said recesses, said bolt being welded to said corner posts.

12. A cargo carrier as defined in claim 1, said end caps having a cross-sectional shape including a rear flat wall, and a plurality of forwardly extending, laterally spaced hollow ribs in which the spacing of said hollow ribs conforms to the spacing of the inwardly facing ribs of the corrugated panel skin.

13. A cargo carrier as defined in claim 12, said belt rails extending across the inner surface of said end caps and having latch-receiving openings in registration with the spaces between the hollow ribs thereof.

14. A cargo carrier as defined in claim 1 in which the latch means at the ends of each of said cargo restraint bars comprises an end portion of less height than the height of a latch-receiving opening and hook at the bottom of the bar engageable with the bottom edge of a latch-receiving opening of the panel, and a pivoted latch movable into such opening and engageable with the top edge of such opening to prevent lifting thereof to disengage the hook.

15. A cargo carrier as defined in claim 14 in which said pivoted latch has resilient means urging it toward the latch-receiving opening.

16. A cargo carrier as defined in claim 15 in which said latch has a laterally enlarged head remote from its pivot dimensioned to fit closely between the sides of a latch-receiving opening.

17. A panel for attachment to the side wall of a cargo carrier and dimensioned to substantially cover such wall, said panel comprising rigid top and bottom caps extending horizontally for the full length of each panel, and rigid end caps extending vertically at the ends of each panel, said caps being rigidly connected together at their ends to form a rigid rectangular frame, a panel skin of corrugated metal entirely covering the space between said caps, the corrugations of said skin extending vertically to define a multiplicity of vertical elongated channels and interposed ribs exposed at the inboard sides of the panel, a multiplicity of belt rails extending horizontally between said end caps and secured thereto in spaced apart relation at the inboard side of said panel, said rails having latch-receiving openings in registration with said channels.

18. A panel as defined in claim 17 in which said belt rails are secured to a multiplicity of the ribs of the panel skin.

19. A panel as defined in claim 18 in which said belt rails are welded to the ribs of said skin exposed at the inboard side thereof.

20. A panel as defined in claim 18 comprising in addition a plurality of parallel horizontal vertically spaced tension strips secured to the outboard sides of each of said panels.

21. A panel as defined in claim 20 in which the ends of said tension strips are permanently secured to said end caps.

22. A panel as defined in claim 21 in which the tension strips are also permanently secured to the top surfaces of the ribs of the panel skin at the outboard sides thereof.

23. A panel as defined in claim 17 in which said top and bottom caps are provided with latch-receiving openings such as those provided in said belt rails.

24. A panel as defined in claim 17 in which said top and bottom caps have inwardly open channels in which the top and bottom ends of the end caps are secured.

25. A panel as defined in claim 17 in which the ends of said top and bottom caps have longitudinally outwardly facing threaded recesses, adjustable corner bolts in said recesses, said bolts being welded to said corner posts.

26. A panel as defined in claim 17, said end caps having a cross-sectional shape including a rear flat wall, and a plurality of forwardly extending, laterally spaced hollow ribs in which the spacing of said hollow ribs conforms to the spacing of the inwardly facing ribs of the corrugated panel skin.

27. A panel as defined in claim 26, said belt rails extending across the inner surface of said end caps and having latch-receiving openings in registration with the spaces between the hollow ribs thereof.

* * * * *